United States Patent [19]

Waksberg

[11] 4,064,434
[45] Dec. 20, 1977

[54] RETRO-REFLECTION COMMUNICATION SYSTEM

[75] Inventor: Armand Waksberg, Dollard-des-Ormeaux, Canada

[73] Assignee: RCA Limited, Quebec, Canada

[21] Appl. No.: 720,790

[22] Filed: Sept. 7, 1976

[30] Foreign Application Priority Data

June 7, 1976 Canada .................................. 254169

[51] Int. Cl.² ............................................ H04N 7/18
[52] U.S. Cl. ...................................... 250/199; 358/209
[58] Field of Search ............... 250/199; 350/102, 103, 350/160 R, 160 LC, 161, 307; 358/209, 217, 229

[56] References Cited

U.S. PATENT DOCUMENTS

| 3,493,294 | 2/1970 | Fitzmaurice | 250/199 |
| 3,845,238 | 10/1974 | Schneider | 358/209 |
| 3,943,357 | 3/1976 | Culver | 250/199 |

*Primary Examiner*—Howard W. Britton

[57] ABSTRACT

A communication system uses a laser beam directed along a path and a retrodirective reflector to return the beam along the same path. The front face of the retrodirective reflector is covered by a layer of an electro-optic material which, in response to an electric field produced by a vidicon, modifies the reflectivity of the reflector. The laser beam, when passing through the electro-optic material, is modulated by the output of the vidicon, and the modulated beam is returned along the given path to a suitable receiving means.

19 Claims, 5 Drawing Figures

U.S. Patent   Dec. 20, 1977   Sheet 1 of 2   4,064,434
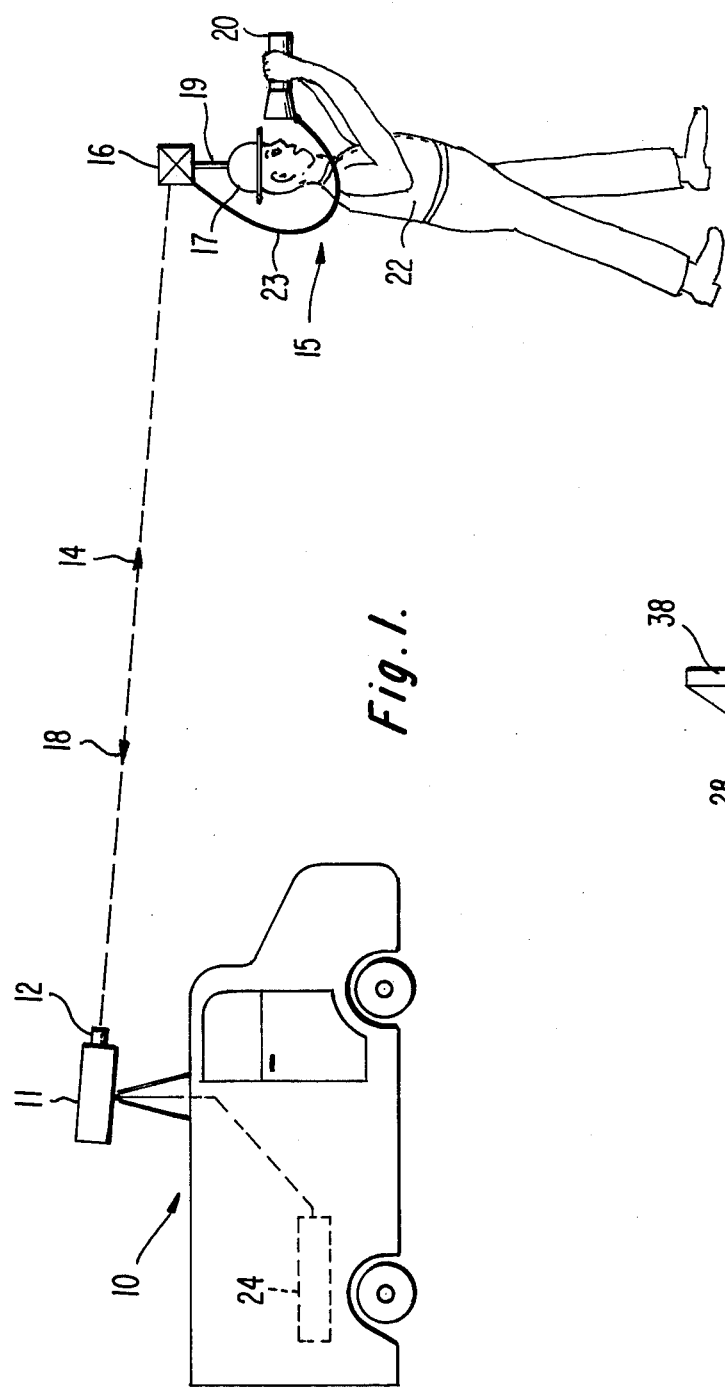
Fig.1.
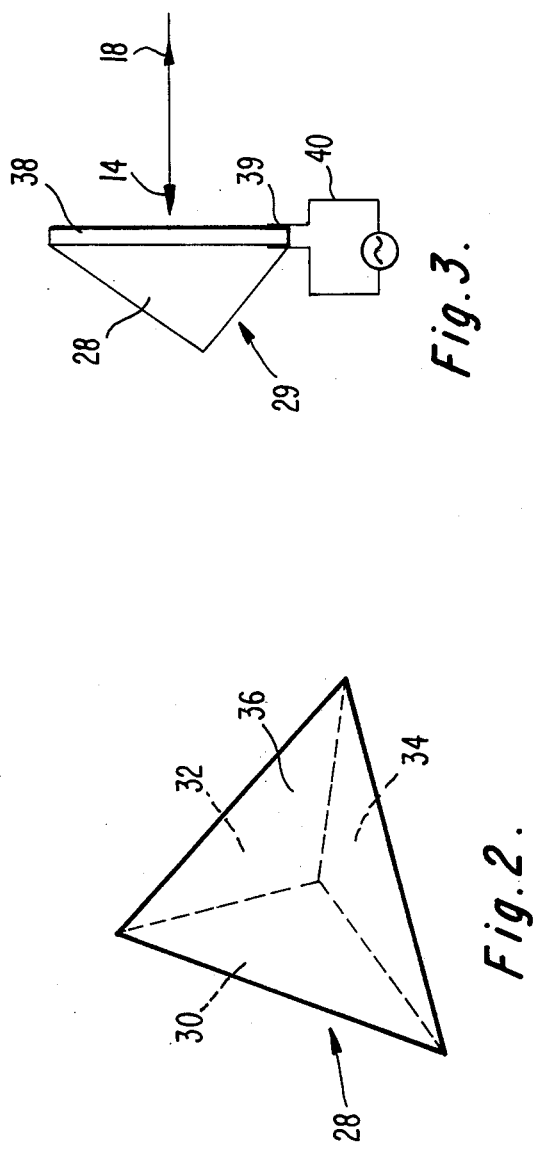
Fig.2.
Fig.3.

RETRO-REFLECTION COMMUNICATION SYSTEM

FIELD OF THE INVENTION

The present invention is directed to a communication system using a laser source and a retrodirective modulator at a transmitter station responsive to a laser beam from that source. The invention is also directed to a retrodirective modulator as a novel element. The present invention is particularly concerned with an improved communication system in which the transmitter station is considerably reduced in weight and in volume so that it may be easily carried by a person.

BACKGROUND OF THE INVENTION

The system of the present invention is intended to replace communication by microwave or cables. It is particularly useful, for example, in applications where a T.V. cameraman is at the scene of an event, relaying a television signal directly to a receiving station. Such a cameraman typically was required heretobefore to carry, in addition to his T.V. camera, an electronic transmitter station for operation with a microwave or cable connection. This meant that the cameraman had to carry a packsack on his back to hold the transmitter station or, if the camera is integrated to the transmitter station, the assembly had to be coupled to a shoulder hook and pad to relieve the arms from the excess weight. The present invention overcomes the above mentioned disadvantages by allowing more mobility to the cameraman who, quite often, has to make his way through a crowd and has to carry his equipment for very long periods of time.

SUMMARY OF THE INVENTION

A communication system according to the invention comprises a laser source for projecting a laser beam onto a retrodirective reflector at least a surface of which is covered by a layer of an electro-optic substance arranged to impress a modulation onto the laser beam in response to an electric or magnetic field applied to the layer, the modulated laser beam being returned retrodirectively over the laser beam path toward the laser source. The covered retrodirective reflector and the means for providing the modulation of the laser beam by the electro-optic substance essentially comprise the transmitter station of the communication system. The retrodirective reflector covered with the modulating material will be referred to as a retro-modulator and constitutes a new and useful element per se.

BRIEF DESCRIPTION OF THE DRAWINGS

FIG. 1 illustrates a communication system according to an embodiment of the invention, FIG. 2 is a perspective view of a retrodirective reflector, FIG. 3 is a side view of a retro-modulator schematically connected to a signal source.

DETAILED DESCRIPTION

Figure 4:
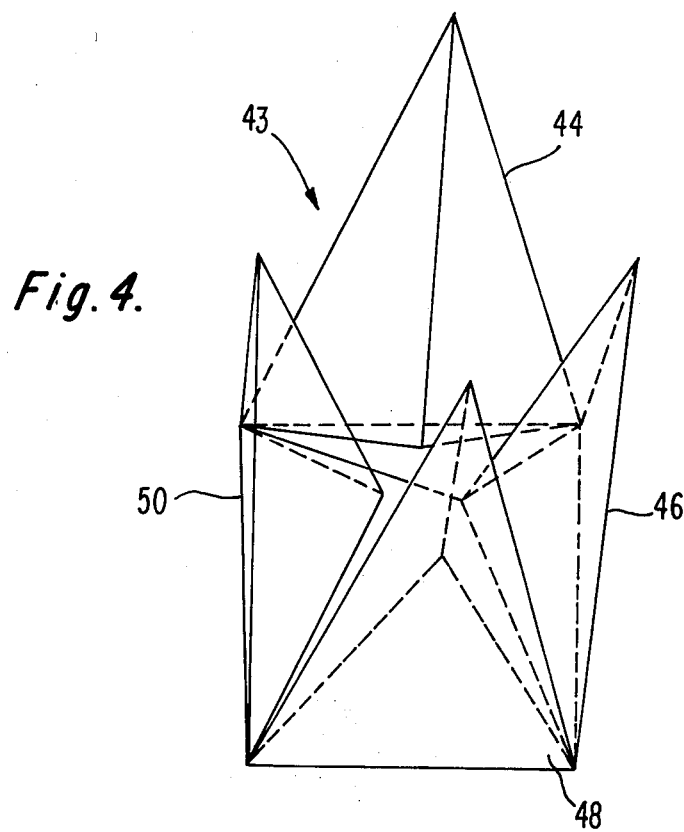
FIGS. 4 and 5 are schematic representations of a perspective and a top plan view of a combination of four trihedral prisms adapted to be fixed on a suitable mount.

While the invention will be described in connection with a video communication system, the invention can also be used for more general types of radio communication systems. As shown in FIG. 1, a receiver station, shown generally at 10, is provided with a laser source 11 equipped with an optical lens system 12 for projecting a laser beam 14. A transmitter station shown generally at 15 is provided with a retro-modulator consisting of a trihedral prism arrangement 16 which receives the laser beam 14 and reflects or returns a beam 18 along the same path as beam 14, the beam 18 having been impressed by a video-modulation supplied via a suitable connection 23 from a vidicon camera 20 operated by the cameraman 22. The reflected, modulated beam 18 returns through the optical lens system 12, and the video information is further processed by suitable circuitry 24.

The laser source 11 may be manually aimed in the direction of the retromodulator 16 but known automatic tracking devices such as a quadrant detector, not shown, can be used, in combination with the laser source, to follow the retro-modulator 16. The laser beam 14 is constantly directed in the desired direction and this allows great mobility at the transmitter station 15. The trihedral prism arrangement per se does not have to be actively aimed to return the modulated beam because it is its inherent function to return a light beam along the same path it is received. Accordingly this eliminates the necessity of providing the transmitter station with a tracking device. The transmitter station can therefore be designed with great simplicity because it is essentially limited to the retro-modulator, its support and its modulation means. This characteristic implies light weight, small dimensions, portability and flexibility. The present system is particularly adopted for field use, on the spot reporting, reconnaissance and surveillance. The station including the laser source 11 and processing circuitry 24, however, can be located in a more complex unit such as in a building or a truck, as represented in FIG. 1.

A retrodirective reflector may be a single trihedral prism as shown generally at 28 in FIG. 2, whose shape is constituted of three faces 30, 32 and 34 shaped as equal right-angle triangles, forming the corner of a cube, the fourth face 36 forming the closing surface along the hypotenuse of the three right-angle triangles. A beam of light which penetrates in the prism through face 36 will be reflected by the three other faces and will come out through the same face 36 in the same direction as the incoming beam. The retro-modulator 29 according to this embodiment and shown in FIG. 3, is formed by a retrodirective reflector 28 on which a layer 38 of an electro-optic material has been applied on the entrance face 36 between suitable electrodes 39. The material 38 exhibits variable reflectivity effects such as polarization and scattering when subjected to an electric or magnetic field passing through the circuit 40 (FIG. 3). A modulated electric or magnetic signal applied to the layer 38 will impress upon the impinging beam 14 a corresponding modulation to the reflected beam 18.

Various materials may be chosen for the layer 38 depending on the characteristics desired.

POLARIZATION MODULATOR

Ferroelectric ceramics such as Lead-zirconate-lead-titanate (PZT) may be used in the form of thin polished plates as efficient light valves and for display in a voltage-controlled mode. These plates are described in IEEE Transactions on Electron Devices ED-M, 148, February 1970 by J. R. Maldonado and A. H. Meitzler.

They can be made relatively large and can be applied on the front face of a standard retrodirective reflector such as shown in FIG. 3. A field is applied across the face of the plates by transparent electrodes such as tin oxide-doped indium oxide ($I_{n2}O_3$). The electric field produces a phase retardation between the two electro-optic axes of the birefringent ferroelectric ceramics such as PZT which is used to return a polarized laser beam with a polarization component perpendicular to its original direction. This electrically induced polarization can then be detected at the receiver station 10 by means of a polarizer cross-polarized to that of the laser. According to the above-mentioned article by Maldonado et al, these ferro-electric ceramic materials can provide a switching speed of up to 10 ns. This speed gives bandwidths of the order of 30 MHz which is quite adequate even for video information.

SCATTERING-MODE MODULATOR

Other ferroelectric ceramics exhibit electro-optic scattering effect. In particular, rhombohedral-phase lead-lanthanum-zirconate-titanate (PLZT) ceramics and in particular coarse grain PLZT produce strong longitudinal electro-optic scattering effects when subjected to an electric field. This phenomena has been demonstrated by W. D. Smith and C. E. Land and described in an article entitled "Scattering-Mode-Ferroelectric-Photoconductor Image" which appeared in Applied Physics Lett., of Feb. 15, 1972. Contrast ratios as high as 500 were obtained. For the purpose of the present invention, this material is applied to the front face of a retrodirective reflector as shown at 38 in FIG. 3. A modulation of the returned laser beam is obtained by effectively changing the reflectivity through the scattering effect. This particular type of modulation is very appealing because it does not require polarizers, because it has non-critical tolerances and because, also, it is simple to manufacture.

VARIABLE REFLECTIVITY MODULATOR

A third class of material may be used for the electro-optic layer 38. It consists of a layer of liquid crystals positioned on the front face 36 of the retro-directive reflector 28 as shown in FIG. 3. The crystals may also be applied on the three perpendicular faces of the reflector 28 or any single one to act as a reflective back electrode in order to vary the reflectivity of the retro-modulator. This dynamic scattering effect is described by G. H. Heilmeier et al in Proceedings of the IEEE Vol. 56, No. 7, July 1968. The liquid crystals for the present invention are of the type which exhibit mesomorphic behaviour and in particular of the nematic class.

In the arrangement illustrated in FIG. 1, the vidicon camera 20 is connected to the retro-modulator 16 and in particular to the layer 38 by means of electrodes and the connection 23 for providing the modulation to be impressed on the returned laser beam 18. It should be understood that although the above described examples are mainly contemplated for video modulation, radio, as well as various electric and magnetic modulations could be used to impress the beam. The retro-modulator does not require a tracking device. It only needs to be directed in the general direction of the receiver station. Trihedral prisms of the type produced by Precision Optical Mfg. Inc. of California require no alignment even up to an incidence angle of 45°.

Figure 5:
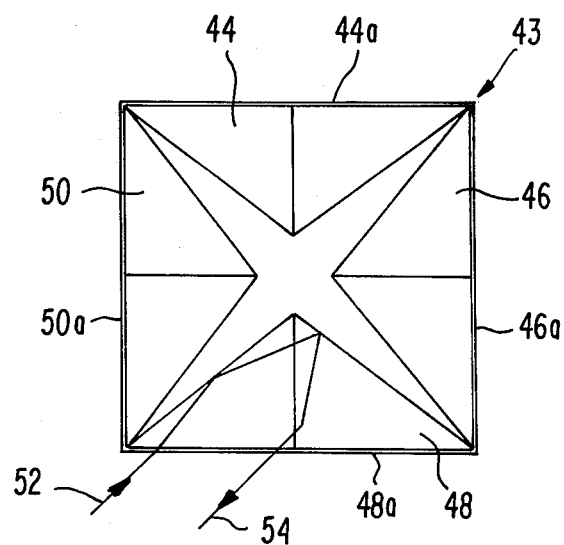

The retro-modulator may consist of different embodiments. It may comprise one or a plurality of trihedral prisms and a variety of fixed or moveable supports. One preferred embodiment is illustrated in FIGS. 4 and 5 and consists of four trihedral prisms 44, 46, 48 and 50 each having an operating angle of 90° and disposed around a vertical axis so as to cover a total operation angle of 360°. The prisms are covered, on the entrance face by an electro-optic material 44a, 46a, 48a and 50a. In the top view of the retro-modulator 43 illustrated in FIG. 5, a beam 52 enters the prism 48 at about 45° of incidence and comes out as a modulated beam 54 after passing through the electro-optic material 48a. With this arrangement of prisms, an incident light beam coming from whatever angle of incident, on the retro-modulator 43, is returned in the direction of its source.

In operation, the retro-modulator 43 is mounted on a fixed support to a workman's hard hat 17 of a cameraman as shown in FIG. 1. The laser source projects a beam of such a divergence so as to take into account the deflection caused by the turbulence of the air and to permit some lateral movement of the cameraman while the retro-modulator remains within the cross-section of the beam. A cross-section of about one square meter in the plane of the retro-modulator is generally sufficient. Furthermore, the laser source 11 can be provided with a tracking device to follow more elaborate displacements of the cameraman. Rotation of the cameraman on himself is possible by the four sides of the retro-modulator 43. The cameraman has also a great flexibility of vertical movement due to the ± 45° angle of the prisms.

Another suitable embodiment for the retro-modulator consists of one trihedral prism also mounted on a workman's hard hat and supported by a known gyrostabilized platform. Tiny gyroscopes are known for stabilizing optical elements in order to prevent fuzzy image caused by jittery movements of hand-held cameras or binoculars. A miniature electromechanical servo-system links one or more gyroscopes to the optical element such as used in the Dynalens manufactured by Dynascience Corporation of the United States.

A low friction vertical axis mount may also be contemplated to support one trihedral prism. In particular, the prism may be mounted on the periphery of a weighted disc which is supported on its axle in a free-friction manner. This arrangement may be secured on a workman's hard hat or a semi-stationary mount. Once the prism is oriented in the correct direction, the mount will be able to rotate about the axis of the disc while the prism will have the tendency to maintain its original position. Further, the retro-modulator using one prism may be mounted, on a stationary tripod, at a suitable location, relative to the source and a nomadic cameraman, and connected by a cable to the camera.

Anyone of these retro-modulators and supports may be selected depending on the performances expected. A variety of them have been herein referred to, essentially for illustrating the scope of the possibilities of application of this invention.

A characteristic of the present invention is that the transmitter station does not have to generate its own laser beam. This implies a substantial saving of power at the transmitter station. This explains partly why the transmitter can remain small and light.

Another characteristic of the invention makes this arrangement an improvement over the use of a low power laser at the transmitting station. It consists in the convergence of the laser beam. With the present invention, the returned beam 18 is collimated towards the receiver station with a divergence angle as narrow as the one allowed by diffraction limited optics of the same diameter as the retro-modulator diameter. The diffraction angle is $\theta = d/\lambda$ where $\lambda$ is the laser wavelength and $d$ is the diameter of the retro-modulator. In the case of a more conventional system which would utilize a low power laser at the transmitter station, the required diffraction limited collimated beam would have to be accurately pointed towards the receiver station at all times to alleviate the requirement of the pointing accuracy in this conventional system. A broad angle transmitted beam could be used but a much more powerful laser would be needed. In fact, it would have to be of a few orders of magnitude more powerful. The retro-modulator as contemplated by the present invention overcomes this requirement because it can return the beam back to retrace its own path with a high degree of accuracy and over a wide angle of view while keeping the beam width down to the diffraction of its aperture.

The retro-modulator can be addressed by different types of lasers from visible to near infra-red without requiring any change in the transmitter station. For surveillance and reconnaissance assignments, an infrared laser may be used. It is evident that the retro-directive reflector must be made of a material transparent to the part of the electro-magnetic spectrum used. In the embodiment shown in FIG. 3, the modulating material is applied on the front face of the retrodirective reflector 28. In this case, the electrodes 39 are transparent. It is also possible to apply the modulating material on the back faces 30, 32 and 34 of the retrodirective reflector and use the reflective mode of operation. In this case only, the front electrode needs to be transparent. Because the incoming light beam is reflected on the three back faces it would be satisfactory in some cases, to apply the modulating material to only one back face of the retro-directive reflector. Electrodes of known composition comprising aluminum, indium and in particular tin oxide-doped indium oxide are used for this invention. They may be applied as described in the above mentioned references.

The communication system may be used for permanently located transmitter and receiver stations but lends itself with great advantage when the transmitter station is mobile and within a limited radius of the receiver. A He-Ne laser performs satisfactorily within a radius of five kilometers but more powerful sources such as a $CO_2$ laser can increase the operating range to 20 km.

The communication system according to the invention may be used as a main communication line as illustrated in FIG. 1 but may also be used as a complementary communication line. One application consists in adding the novel system to an existing combination of a transmitter and a receiver when they are in a direct line of sight. In existing systems, the image received by a vidicon is returned to the T.V. station for processing. It would be an asset if the synchronization pulse information could be added at the transmitter station. This result can be achieved by installing a retro-modulator at the T.V. station and a laser source in the vicinity of the vidicon. Then the scanning synchronization signals can be impressed on the laser beam at the T.V. station and returned to the camera station. The processed image is accordingly ready to be picked up and received on a monitor or a standard T.V. set with the same synchronization pulse as that from the station. This way there is no interruption in synchronization and therefore no break in the image.

What is claimed is:
1. A communication system comprising:
   a laser source having an optical system adapted to produce a laser beam along a path,
   a transmitter station comprising a retrodirective reflector for receiving the laser beam from the said source and reflectively returning it along the same path, and, a modulating means for impressing a modulation unto said beam as it is being returned, said modulating means comprising a mechanically stable layer of an electro-optic material mounted on a surface of the said retro-directive reflector to receive and directly act on said beam, said material being adapted to modify its operating characteristics to modulate said beam in response to a modulating signal applied to said material,
   a receiver station for receiving the returned laser beam impressed with the said modulation,
   whereby the beam from said laser source is directed towards the retro-directive reflector, is modulated by the said electro-optic material according to the modulating signal applied to said material and returned through the same path by the said retro-directive reflector and received by said receiver station.

2. A system as recited in claim 1, comprising mounting means for said laser source to direct said laser beam at said transmitter station.

3. A system as recited in claim 1, wherein said transmitter station includes a vidicon camera for generating said signal applied to said material.

4. A system as recited in claim 1, wherein said receiver station comprises an optical system for receiving the modulated beam, the said last-mentioned optical system being the same as the optical system of said laser source.

5. A system as recited in claim 1, wherein said electro-optic material is a ferroelectric ceramic material.

6. A system as recited in claim 5, wherein the said ferroelectric material is made of lead zirconate-lead titanate.

7. A system as recited in claim 5, wherein the said ferroelectric material is made of rhombohedralphase lead-lanthanum-zirconate-titanate.

8. A system as recited in claim 1, wherein the said electro-optic material are nematic liquid crystals.

9. A system as recited in claim 1, wherein the electro-optic material is applied on the entrance face of the said reflector and disposed between a pair of electrodes and said material, the said electrodes being transparent.

10. A system as recited in claim 1, wherein said reflector consists of at least a single trihedral prism having three faces shaped as equal right-angle triangles and a fourth face forming the closing surface along the hypotenuse of the three right-angle triangles, said electro-optic material being positioned on at least one of the faces of said reflector and disposed between a pair of electrodes.

11. A retro-modulator comprising:
   a. a retrodirective reflector adapted to receive from a given direction a laser beam and return it in the same direction;
   b. a mechanically stable layer of an electro-optic material mounted on a surface of said retrodirective reflector to receive and directly act on said beam, said material being adapted to modify its operating characteristics to modulate said beam in response to a modulating signal applied to said material;

c. a pair of electrodes connected to said layer for applying said modulating signal to said layer, whereby the laser beam received by said reflector is modulated by said electro-optic material according to the modulating signal applied to said material.

12. A retro-modulator as recited in claim 11, wherein the electro-optic material is a ferroelectric ceramic material.

13. A retro-modulator as recited in claim 12, wherein the ferroelectric material is made of lead zirconate-lead titanate.

14. A retro-modulator as recited in claim 12, wherein the ferroelectric material is made of rhombohedral-phase lead-lanthanum-zirconate-titanate.

15. A retro-modulator as recited in claim 11, wherein the electro-optic material is a birefringent material adapted to produce a phase retardation of the laser beam when the said material is subjected to said signal.

16. A retro-modulator as recited in claim 11, wherein the electro-optic material is a nematic liquid crystal.

17. A retro-modulator as recited in claim 11, wherein said reflector consists of a multi-faced prism having an entrance face and reflecting faces, said electro-optic material being positioned on said entrance face of said reflector, said electrodes and said material being transparent to said laser beam.

18. A retro-modulator as recited in claim 11, wherein said reflector consists of a multi-faced prism having an entrance face and a plurality of reflecting faces, said electro-optic material being positioned on at least one of said reflecting faces with one of said electrodes being positioned at the front of said layer and transparent to said laser beam.

19. A system as recited in claim 1, wherein the electro-optic material is a birefringent material adapted to produce a phase retardation of the laser beam when the said material is subjected to said signal.

* * * * *